United States Patent
Hong et al.

(10) Patent No.: US 11,946,998 B2
(45) Date of Patent: *Apr. 2, 2024

(54) SYSTEMS AND METHODS FOR DOPPLER-ENHANCED RADAR TRACKING

(71) Applicant: Oculii Corp., Beavercreek, OH (US)

(72) Inventors: Lang Hong, Beavercreek, OH (US); Steven Hong, Beavercreek, OH (US)

(73) Assignee: Oculii Corp., Beavercreek, OH (US)

( * ) Notice: Subject to any disclaimer, the term of this patent is extended or adjusted under 35 U.S.C. 154(b) by 196 days.

This patent is subject to a terminal disclaimer.

(21) Appl. No.: 17/560,668

(22) Filed: Dec. 23, 2021

(65) Prior Publication Data

US 2022/0113396 A1 Apr. 14, 2022

Related U.S. Application Data

(63) Continuation of application No. 16/800,906, filed on Feb. 25, 2020, now Pat. No. 11,237,261, which is a continuation of application No. 15/676,018, filed on Aug. 14, 2017, now Pat. No. 10,613,212.

(51) Int. Cl.
*G01S 13/72* (2006.01)
*G01S 13/58* (2006.01)
*G01S 13/90* (2006.01)
*H01Q 21/06* (2006.01)

(52) U.S. Cl.
CPC ............ *G01S 13/72* (2013.01); *G01S 13/584* (2013.01); *H01Q 21/06* (2013.01); *G01S 13/9047* (2019.05)

(58) Field of Classification Search
CPC .... G01S 13/72; G01S 13/584; G01S 13/9047; H01Q 21/06
See application file for complete search history.

(56) References Cited

U.S. PATENT DOCUMENTS

| | | |
|---|---|---|
| 3,691,560 A | 9/1972 | Hammack |
| 3,978,482 A | 8/1976 | Williams et al. |
| 4,042,927 A | 8/1977 | Helms |
| 4,084,158 A | 4/1978 | Slawsby |
| 4,246,585 A | 1/1981 | Mailloux |
| 4,544,927 A | 10/1985 | Kurth et al. |
| 4,546,355 A | 10/1985 | Boles |
| 4,717,916 A | 1/1988 | Adams et al. |
| 4,723,124 A | 2/1988 | Boles |

(Continued)

OTHER PUBLICATIONS

Gonzalez, Hector A., et al., "Doppler Ambiguity Resolution for Binary-Phase-Modulated MIMO FMCW Radars, 2019 International Radar Conference, Sep. 23-27, 2019."

(Continued)

*Primary Examiner* — Donald H B Braswell
(74) *Attorney, Agent, or Firm* — Christopher P. Maiorana, PC

(57) ABSTRACT

A method for Doppler-enhanced radar tracking includes: receiving a reflected probe signal at a radar array; calculating a target range from the reflected probe signal; calculating a first target angle from the reflected probe signal; calculating a target composite angle from the reflected probe signal; and calculating a three-dimensional position of the tracking target relative to the radar array from the target range, first target angle, and target composite angle.

20 Claims, 9 Drawing Sheets

(56) References Cited

U.S. PATENT DOCUMENTS

| | | | |
|---|---|---|---|
| 4,794,395 | A | 12/1988 | Cindrich et al. |
| 4,996,532 | A | 2/1991 | Kirimoto et al. |
| 5,218,359 | A | 6/1993 | Minamisono |
| 5,225,839 | A | 7/1993 | Okurowski et al. |
| 5,278,757 | A | 1/1994 | Hoctor et al. |
| 5,847,673 | A | 12/1998 | Debell |
| 5,945,926 | A | 8/1999 | Ammar et al. |
| 7,535,409 | B1 | 5/2009 | Choe et al. |
| 7,609,198 | B2 | 10/2009 | Chang |
| 8,269,137 | B2 | 9/2012 | Ehrmann et al. |
| 8,312,771 | B2 | 11/2012 | Randall et al. |
| 8,482,455 | B2 | 7/2013 | Kemkemian et al. |
| 9,103,671 | B1 | 8/2015 | Breed et al. |
| 9,470,782 | B2 | 10/2016 | Millar et al. |
| 9,541,638 | B2 | 1/2017 | Jansen et al. |
| 9,869,762 | B1 | 1/2018 | Alland et al. |
| 10,048,366 | B1 | 8/2018 | Hong et al. |
| 10,509,119 | B2 | 12/2019 | Hong et al. |
| 2002/0180636 | A1 | 12/2002 | Lin et al. |
| 2004/0178951 | A1 | 9/2004 | Ponsford et al. |
| 2007/0013575 | A1 | 1/2007 | Lee et al. |
| 2007/0285315 | A1 | 12/2007 | Davis et al. |
| 2008/0122681 | A1 | 5/2008 | Shirakawa |
| 2008/0159416 | A1 | 7/2008 | Melick et al. |
| 2008/0250875 | A1* | 10/2008 | Khosla ............... G01N 35/0092 73/863 |
| 2008/0291077 | A1 | 11/2008 | Chang |
| 2009/0135046 | A1 | 5/2009 | Steele et al. |
| 2009/0174590 | A1 | 7/2009 | Huizing et al. |
| 2009/0201206 | A1 | 8/2009 | Li et al. |
| 2009/0231181 | A1 | 9/2009 | Yannone |
| 2010/0019954 | A1 | 1/2010 | Mizutani et al. |
| 2010/0156701 | A1 | 6/2010 | Shirakawa |
| 2010/0194629 | A1 | 8/2010 | Craig et al. |
| 2010/0220001 | A1 | 9/2010 | Longstaff |
| 2010/0328157 | A1 | 12/2010 | Culkin et al. |
| 2011/0050500 | A1 | 3/2011 | Shirakawa |
| 2011/0241928 | A1 | 10/2011 | Oswald et al. |
| 2011/0298676 | A1 | 12/2011 | Yanagihara et al. |
| 2012/0001791 | A1 | 1/2012 | Wintermantel |
| 2012/0112954 | A1 | 5/2012 | Kurono et al. |
| 2012/0268309 | A1 | 10/2012 | Samuel et al. |
| 2012/0299773 | A1 | 11/2012 | Stirling-Gallacher et al. |
| 2013/0069818 | A1 | 3/2013 | Shirakawa et al. |
| 2013/0120191 | A1 | 5/2013 | Zhang et al. |
| 2013/0300596 | A1 | 11/2013 | Shirakawa |
| 2014/0197984 | A1 | 7/2014 | Wang et al. |
| 2014/0266898 | A1 | 9/2014 | Linnenbrink |
| 2015/0102954 | A1 | 4/2015 | Hong |
| 2015/0270609 | A1 | 9/2015 | Jin |
| 2015/0301167 | A1* | 10/2015 | Sentelle ............... H01Q 9/27 342/22 |
| 2016/0069994 | A1* | 3/2016 | Allen ............... G01S 13/4454 342/29 |
| 2017/0031013 | A1 | 2/2017 | Halbert et al. |
| 2017/0082730 | A1 | 3/2017 | Kishigami et al. |
| 2017/0141454 | A1 | 5/2017 | Welle |
| 2017/0212213 | A1 | 7/2017 | Kishigami |
| 2017/0315229 | A1 | 11/2017 | Pavek et al. |
| 2018/0024235 | A1 | 1/2018 | Hong et al. |
| 2018/0088224 | A1 | 3/2018 | Kishigami |
| 2019/0018128 | A1* | 1/2019 | Shollenberger ..... G01S 13/9029 |
| 2019/0212430 | A1 | 7/2019 | Akamine et al. |
| 2019/0265347 | A1 | 8/2019 | Wintermantel |
| 2019/0293787 | A1 | 9/2019 | Sakai et al. |
| 2019/0324133 | A1 | 10/2019 | Hong et al. |
| 2019/0339374 | A1 | 11/2019 | Kageme et al. |
| 2019/0386712 | A1 | 12/2019 | Fang |
| 2020/0025914 | A1 | 1/2020 | Li et al. |
| 2020/0081110 | A1 | 3/2020 | Nam et al. |
| 2020/0191930 | A1* | 6/2020 | Yunck .................... G01S 7/003 |
| 2020/0191939 | A1 | 6/2020 | Wu et al. |
| 2020/0191940 | A1 | 6/2020 | Wu et al. |
| 2020/0200892 | A1 | 6/2020 | Rajab et al. |

OTHER PUBLICATIONS

Holder, Martin, et al., "Real-Time Graph SLAM based on Radar", IEEE Intelligent Vehicles Symposium (IV), Paris, France, Jun. 9-12, 2019.

Hott, Maurice, et al., "Joint Super-Resolution and Array Interpolation for MIMO Radar Virtual Arrays", Proceedings of the 15th European Radar Conference, Sep. 26-28, 2018, Madrid, Spain.

Kellner, Dominik, et al., "Instantaneous Ego-Motion Estimation using Multiple Doppler Radars", 2014 IEEE International Conference on Robotics & Automation (ICRA) Hong Kong Convention and Exhibition Center May 31-Jun. 7, 2014, Hong Kong, China.

Li, et al., "Target Tracking in Uncertain Multipath Environment using Distributed Angle-of-Arrival Observation", retrieved from online on April 4, 201 (Apr. 4, 2018); retrieved from URL:http://ieeexplore.ieee.org/document/7131228.

Lupfer, Stefanie, et al., "Increasing FastSLAM Accuracy for Radar Data by Integrating the Doppler Information", 2017 IEEE MIT-S International Conference on Microwaves for Intelligent Mobility (ICMIM).

Rapp, Matthias, et al., "A Fast Probabilistic Ego-Motion Estimation Framework for Radak", 2015 European Conference on Mobile Robotics.

Sun, Hongbo, et al., "Analysis and Comparison of MIMO Radar Waveforms", 2014 International Radar Conference, Oct. 13-17, 2014.

* cited by examiner

SYSTEMS AND METHODS FOR DOPPLER-ENHANCED RADAR TRACKING

This application is a is a continuation of U.S. patent application Ser. No. 16/800,906, filed 25 Feb. 2020, which is a continuation of U.S. patent application Ser. No. 15/676,018 filed 14 Aug. 2017, now issued as U.S. Pat. No. 10,613,212, all of which are incorporated in their entirety by this reference.

TECHNICAL FIELD

This invention relates generally to the radar field, and more specifically to new and useful systems and methods for Doppler-enhanced radar tracking.

BACKGROUND

Traditional array-based receivers calculate azimuth and/or elevation by measuring the time or phase difference between received probe signals at different receivers (or antennas) within the array(s), as shown in FIG. 1 (1D array), using beamforming (e.g., digital beamforming). Similar effects may be produced using a transmit array instead of a receiver array. These traditional solutions are limited: angular resolution depends both on the number of elements in the array and the angle between the array and the target:

$$\theta_{resolution} \approx \frac{\lambda}{Nd \cos \theta}$$

where N is the number of elements in the array and d is the distance separating them.

Thus, there is a need in the radar field to create new and useful systems and methods for Doppler-enhanced radar tracking. This invention provides such new and useful systems and methods.

DESCRIPTION OF THE INVENTION EMBODIMENTS

The following description of the invention embodiments of the invention is not intended to limit the invention to these invention embodiments, but rather to enable any person skilled in the art to make and use this invention.

1. System for Doppler-Enhanced Radar Tracking

Figure 2:
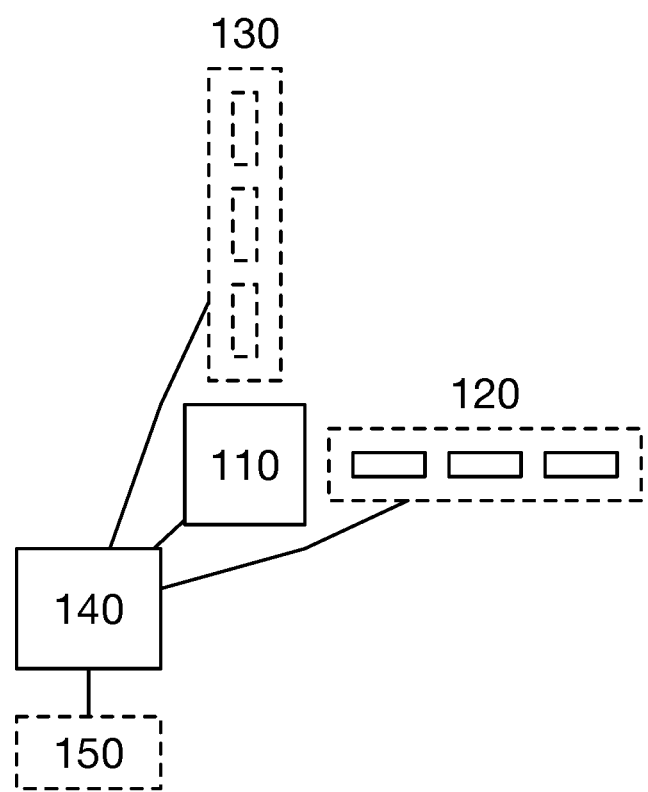
FIG. 2 is diagram view of a system of an invention embodiment.

A system 100 for Doppler-enhanced radar tracking includes a transmitter 110, a horizontal receiver array 120, and a signal processor 140, as shown in FIG. 2. The system 100 may additionally include a vertical receiver array 130 and/or a velocity sensing module 150.

As discussed in the background section, traditional array-based radar systems are limited: angular resolution depends both on the number of elements in the array and the angle between the array and the target:

$$\theta_{resolution} \approx \frac{\lambda}{Nd \cos \theta}$$

where N is the number of elements in the array and d is the distance separating them.

The system 100 utilizes Doppler frequency shift data in addition to traditional data sources (e.g., relative phase to determine elevation/azimuth angle) to provide enhanced accuracy. Frequency shifts due to the Doppler effect are frequently used by radar systems to provide an estimate of relative velocity between radar and target; however, on its own, Doppler data can only provide information about the rate of change of range $$\frac{dR}{dt}.$$

This is fine for applications like traffic control, where radar guns are aligned directly with the direction of travel of targets (e.g., the angle between the line segment connecting target and radar gun and the direction of relative velocity between the target and radar gun is close to zero); however, at non-negligible angles there is a significant difference between $$\frac{dR}{dt}$$

and the actual relative velocity.

While this fact is detrimental for many radar systems, the system 100 takes advantage of this discrepancy in cases where the relative velocity between radar and target is known. In such situations, the composite angle between the radar and the target can be derived. One particular situation involves tracking stationary targets in a moving vehicle with a known velocity. This composite angle can then be used to aid in deriving a tracking solution for the target, thus providing improved angular resolution over traditional systems.

The transmitter 110 functions to transmit a signal that, after reflection by a target, can provide information about the target (e.g., relative location, velocity, etc.). The transmitter 110 preferably transmits a frequency shift keyed (FSK) RADAR signal or a frequency-modified continuous wave (FMCW) RADAR signal, but the transmitter no may transmit any signal satisfying these constraints; e.g., an electromagnetic signal (as in radio waves in RADAR, infrared/visible/UV waves in LIDAR), a sound signal (as in SONAR).

The transmitter no preferably has a single transmitting element (e.g., a single transmit antenna), but may additionally or alternatively have multiple transmitting elements (e.g., as in a radar array). If the transmitter no has multiple elements, these elements may include a single transmitter paired to multiple antennas (e.g., spaced in a particular pattern and/or with antennas coupled to phase/time delays); multiple transmitters, each paired to a single antenna; multiple transmitters paired to multiple antennas, or any other configuration.

The horizontal receiver array 120 functions to receive data resulting from the reflection of the probe signal(s) transmitted by the transmitter 110. The horizontal receiver array 120 preferably measures phase, magnitude, and frequency information from reflected probe signals, but the horizontal receiver array 120 may additionally or alternatively measure any available characteristics of the reflected probe signals.

Figure 3:
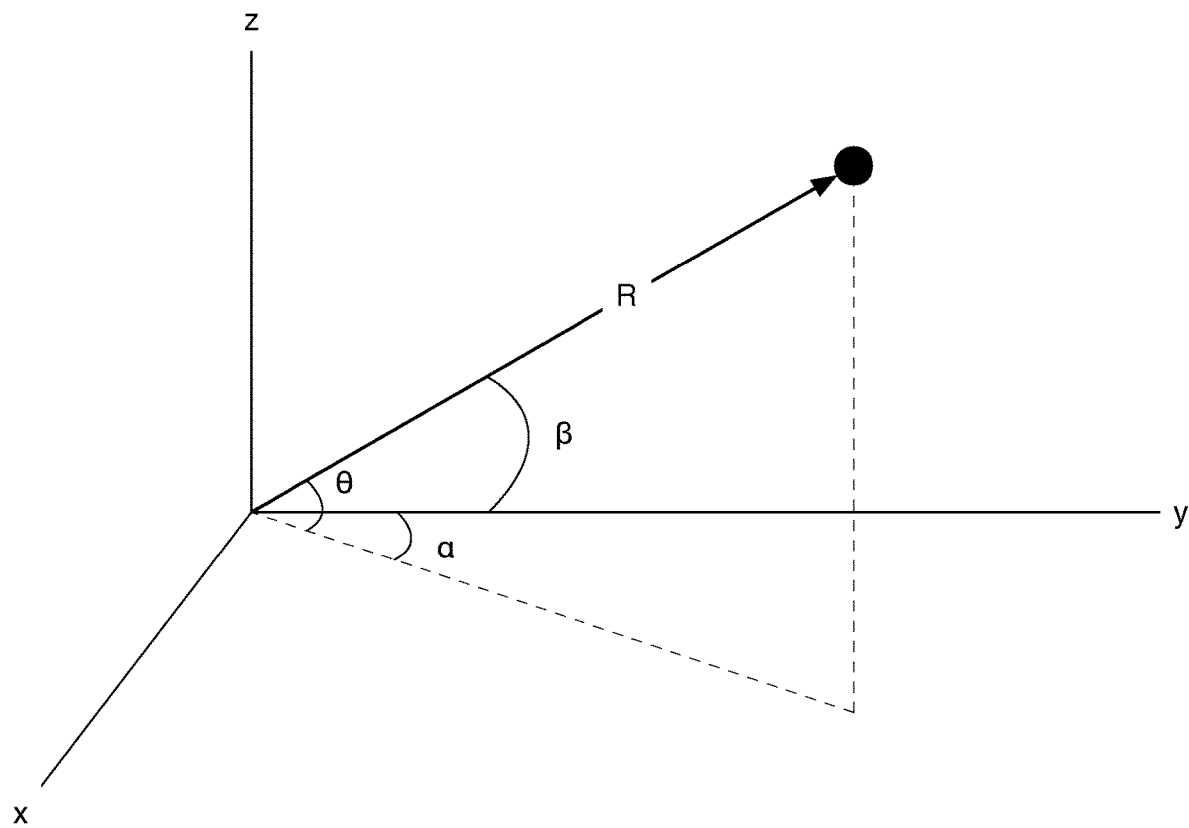
FIG. 3 is an example view of a tracking target in a spherical coordinate system.

From data received from the horizontal receiver array 120, tracking parameters relating to a tracking target may be calculated. The horizontal receiver array 120 is preferably used to determine azimuth ($\alpha$), as shown in FIG. 3, but parameters used to establish target position may be defined in any coordinate system and base, and the horizontal receiver array 120 may be used to determine any relevant tracking parameters. In the present application, target position is preferably represented in a Cartesian coordinate system with the origin at the radar (e.g., x, y, z represents target position) or a spherical coordinate system with the same origin, wherein position is defined by range (R), azimuth ($\alpha$), and elevation ($\theta$); alternatively, target position may be described in any manner. Note that elevation (and similarly azimuth) is an example of an angle between a reference vector and a projected target vector; the projected target vector is the vector between the observer (e.g., the radar) and the target, projected into a reference plane (the reference plane containing the reference vector). The system 100 may calculate any such angles.

The horizontal receiver array 120 includes a set of receiver elements arranged in a pattern; e.g., along a horizontal axis. The set of receiver elements may include a single receiver paired to multiple antennas (e.g., spaced in a particular pattern and/or with antennas coupled to phase/time delays); multiple receivers, each paired to a single antenna; multiple receivers paired to multiple antennas, or any other configuration.

Figure 1:
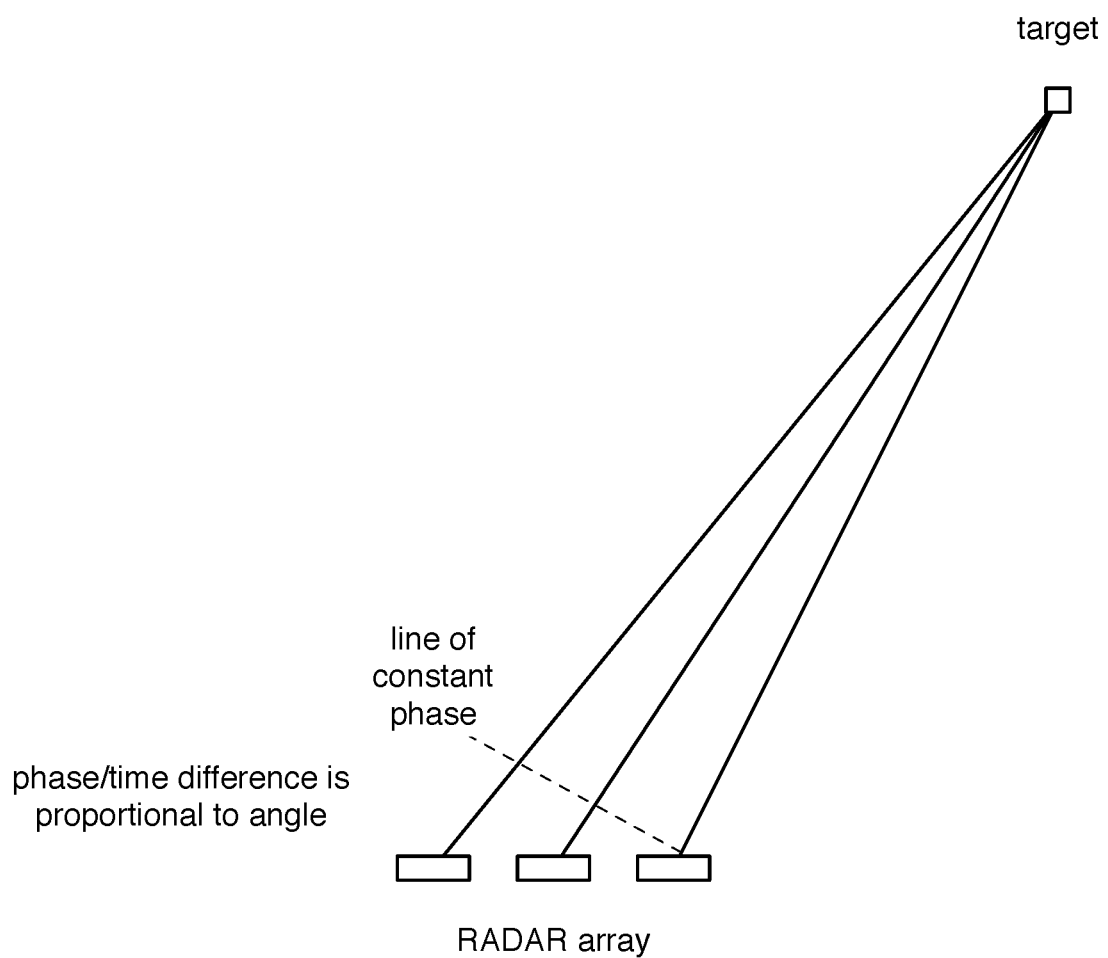
FIG. 1 is a prior art example diagram of a 1D receiver array radar system.

The horizontal receiver array 120 preferably is used to calculate angles from phase information (as described in FIG. 1), but may additionally or alternatively be used to calculate angles in any manner (e.g., using horizontal component of Doppler frequency shift).

The vertical receiver array 130 is preferably substantially similar to the horizontal receiver array 120, except that the vertical receiver array is arranged upon an axis not parallel to the axis of the horizontal receiver array (e.g., a vertical axis). The vertical receiver array 130 is preferably used to calculate elevation, but may additionally or alternatively be used to calculate any tracking parameters.

The signal processor 140 functions to calculate tracking parameters from data collected by the horizontal receiver array 120, the vertical receiver array 130, and/or the velocity sensing module 150. The signal processor 140 preferably includes a microprocessor or microcontroller that calculates tracking parameters according to the method 200; additionally or alternatively, the signal processor 140 may calculate tracking parameters in any manner. The signal processor 140 may additionally or alternatively be used to communicate with an external computer (e.g., to offload computations, receive additional data, or for any other reason). The signal processor 140 may also control configuration of the components of the system 100 or any calculations or actions performed by the system 100.

The velocity sensing module 150 functions to determine the velocity of the system 100 (or components of the system 100, or an object coupled to the system 100). The velocity sensing module is preferably a communications interface that couples to an inertial measurement unit (IMU), but may additionally or alternatively be any communications interface (e.g., Wi-Fi, Ethernet, ODB-II) or sensor (accelerometer, wheel speed sensor, IMU) capable of determining a speed and/or velocity.

2. Method for Doppler-Enhanced Radar Tracking

Figure 4:
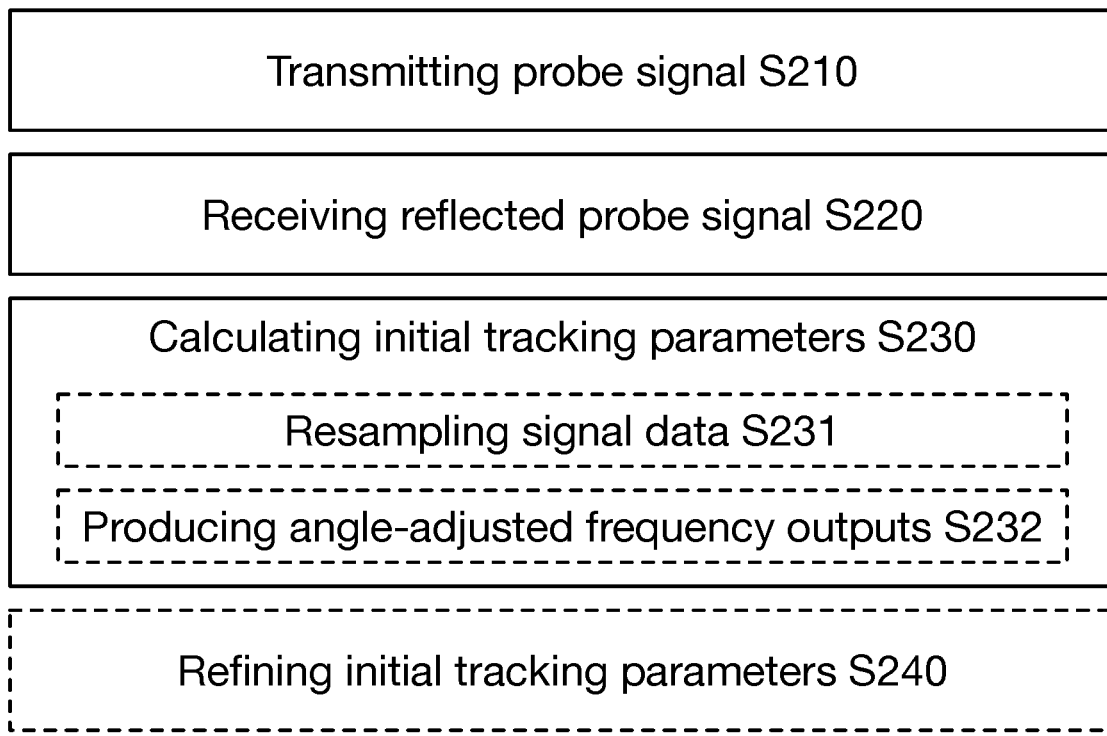
FIG. 4 is a diagram view of a method of an invention embodiment.

A method 200 for Doppler-enhanced radar tracking includes transmitting a probe signal S210, receiving a reflected probe signal S220, and calculating initial tracking parameters from the reflected probe signal S230, as shown in FIG. 4. The method 200 may additionally include refining the initial tracking parameters S240.

As discussed in the background section, traditional array-based radar systems are limited: angular resolution depends both on the number of elements in the array and the angle between the array and the target:

$$\theta_{resolution} \approx \frac{\lambda}{Nd \cos \theta}$$

where N is the number of elements in the array and d is the distance separating them.

The method 200 utilizes Doppler frequency shift data in addition to traditional data sources (e.g., relative phase to determine elevation/azimuth angle) to provide enhanced accuracy. Frequency shifts due to the Doppler effect are frequently used by radar systems to provide an estimate of relative velocity between radar and target; however, on its own, Doppler data can only provide information about the rate of change of range $$\frac{dR}{dt}.$$

This is fine for applications like traffic control, where radar guns are aligned directly with the direction of travel of targets (e.g., the angle between the line segment connecting target and radar gun and the direction of relative velocity between the target and radar gun is close to zero); however, at non-negligible angles there is a significant difference between $$\frac{dR}{dt}$$

and the actual relative velocity.

While this fact is detrimental for many radar systems, the method 200 takes advantage of this discrepancy in cases where the relative velocity between radar and target is known. In such situations, the composite angle between the radar and the target can be derived. One particular situation involves tracking stationary targets in a moving vehicle with a known velocity. This composite angle can then be used to aid in deriving a tracking solution for the target, thus providing improved angular resolution over traditional systems.

The method 200 is preferably implemented by a system for Doppler-enhanced radar tracking (e.g., the system 100), but may additionally or alternatively be implemented using any suitable object tracking system capable of receiving Doppler shift information (e.g., SONAR, LIDAR).

S210 includes transmitting a probe signal. S210 functions to transmit a signal that, after reflection by a target, can provide information about the target (e.g., relative location, velocity, etc.). S210 preferably includes transmitting a frequency shift keyed (FSK) RADAR signal or a frequency-modified continuous wave (FMCW) RADAR signal, but S210 may include transmitting any signal satisfying these constraints; e.g., an electromagnetic signal (as in radio waves in RADAR, infrared/visible/UV waves in LIDAR), a sound signal (as in SONAR).

S220 includes receiving a reflected probe signal. S220 functions to receive data resulting from the reflection of the probe signal transmitted in S210. S220 preferably includes measuring phase, magnitude, and frequency information from reflected probe signals, but S220 may additionally or alternatively include measuring any available characteristics of the reflected probe signals.

S230 includes calculating initial tracking parameters from the reflected probe signal. S230 functions to calculate a set of tracking parameters that identify at least a position of the target relative to the radar receiver; additionally or alternatively, tracking parameters may include additional parameters relevant to object tracking (e.g., target velocity, target acceleration). Note that S230 may include calculating more tracking parameters for a given target than necessary to achieve a position solution; for example, as described later, while only range, azimuth angle, and elevation angle may be necessary to calculate object position, composite angle may also be calculated and used to refine and/or check azimuth/elevation angle calculations.

Further, while S230 primarily includes calculating tracking parameters from the reflected probe signal, S230 may additionally or alternatively calculate or otherwise receive parameters relevant to object tracking (e.g., radar egomotion velocity) that are not calculated using the probe signal.

Parameters used to establish target position may be defined in any coordinate system and base. In the present application, target position is preferably represented in a Cartesian coordinate system with the origin at the radar (e.g., x, y, z represents target position) or a spherical coordinate system with the same origin, wherein position is defined by range (R), azimuth (α), and elevation (θ); alternatively, target position may be described in any manner. Note that elevation (and similarly azimuth) is an example of an angle between a reference vector and a projected target vector; the projected target vector is the vector between the observer (e.g., the radar) and the target, projected into a reference plane (the reference plane containing the reference vector). The method 200 may include calculating any such angles.

While, as previously mentioned, any parameters relevant to object tracking may be calculated in S230, some additional parameters that may be calculated include target range rate $$\left(\frac{dR}{dt},\right.$$

typically calculated from Doppler data), relative target velocity (the velocity of the target with respect to the radar receiver), radar egomotion velocity (referred to in this application as egovelocity, the velocity of the radar receiver relative to a stationary position). These may be related; for example, range rate is equivalent to relative target velocity multiplied by the cosine of the looking angle between the radar and the target.

S230 may additionally or alternatively include calculating composite angle (β, the angle between the target and the radar: β=arccos [cos α×cos θ], see also FIG. 3). While composite angle may be derived from elevation and azimuth (or vice versa), it may also be calculated from Doppler data. If, for example, elevation and azimuth are calculated from a first data source (e.g., phase differences between receivers in a receiver array) and composite angle is calculated from a second data source (e.g., Doppler frequency shift and relative velocity), composite angle can be used alongside elevation and azimuth to produce a more accurate solution.

S230 may include calculating tracking parameters from any suitable data source. For example, operating on a radar system with a horizontal receiver array, azimuth may be calculated based on phase differences between the reflected probe signal seen by each receiver in the array. Likewise, elevation may be calculated in a similar manner by a vertical receiver array (and/or elevation and azimuth may be calculated in similar manners by a two-dimensional receiver array). Range, for example, may be calculated based on travel time of a probe signal. Range rate, for example, may be calculated instantaneously (e.g., using Doppler frequency shift data) or over time (e.g., by measuring change in range over time). Composite angle, as previously discussed, may be derived from elevation/azimuth or calculated explicitly from Doppler data:

$$f_D \approx Kv\cos\beta; K = 2\frac{f_0}{c}.$$

S230 may additionally include calculating relative target velocity in any manner. For example, S230 may include determining that a target is stationary and calculating relative target velocity based on egovelocity (i.e., in this case, relative target velocity is egovelocity). A target may be determined as stationary in any manner; for example, by identifying the target visually as a stationary target (e.g., a stop sign may be identified by its appearance), by identifying the target by its radar cross-section as a stationary target (e.g., a stop sign or a road may be identified by shape or other features), by comparing Doppler data to other (e.g., phase) data (e.g., if the composite angle provided by Doppler data is substantially different from the composite angle derived from elevation and azimuth, that may be a moving target), by the size of the target, or in any other manner. Likewise, egovelocity may be determined in any manner (e.g., a GPS receiver or IMU coupled to the position of the radar receiver, external tracking systems, etc.). As another example, S230 may include receiving relative target velocity information based on external data; e.g., an estimate from a visual tracking system coupled to the position of the radar receiver. Relative target velocity information may even be provided by an external tracking system or the target itself (e.g., transmissions of IMU data from a target vehicle).

In an example implementation of the method 200, S230 includes calculating elevation (though this angle may be any angle in a plane perpendicular to a receiver array; e.g., azimuth) using phase or time difference information and calculating composite angle using Doppler frequency shift data and velocity data. This example implementation is preferably used with a one-dimensional radar array (which, using traditional techniques, is capable of determining only elevation and not azimuth), but may additionally or alternatively be used with any radar system. In this example implementation, the composite angle may be used, along with the elevation and range, to produce a tracking solution. Note that this example implementation both expands the dimensionality of the radar array (producing three-dimensional data instead of two-dimensional data from the one-dimensional array), and also provides for increased accuracy over a traditional two-dimensional radar array (because the angular resolution of the Doppler-generated composite angle is often higher than the angular resolution of elevation and azimuth generated by traditional solutions).

In a second example implementation of the method 200, S230 includes calculating elevation and azimuth (though this angle may be any two perpendicular angles in a plane perpendicular to a receiver array) using phase or time difference information and calculating composite angle using Doppler frequency shift data and velocity data. This example implementation is preferably used with a two-dimensional radar array (which, using traditional techniques, is capable of determining both elevation and azimuth), but may additionally or alternatively be used with any radar system. In this example implementation, the composite angle may be used, along with the elevation, azimuth and range, to produce a tracking solution. In this example, the composite angle may be used as a constraint or filter to improve the accuracy of elevation and azimuth estimates, thus greatly improving the accuracy of the data produced.

While simply using Doppler-derived angles already provides substantial improvement to traditional techniques, S230 may include multiple techniques for providing additional improvement.

For example, the relative velocity of radar targets changes (in many applications) substantially slower than sample rate of Doppler shift; accordingly, velocity data may be averaged or otherwise smoothed to reduce noise and improve accuracy. Given a Doppler shift sample k and consecutive sample k+1:

$$f_{Dk} = Kv_k \cos\beta_k; f_{Dk+1} = Kv_{k+1} \cos\beta_{k+1}$$

requirements on velocity can be relaxed ($v_k \approx v_{k+1}$), leading to:

$$\frac{f_{Dk}}{f_{Dk+1}} = \frac{\cos\beta_k}{\cos\beta_{k+1}}$$

To determine Doppler frequency shift, S230 may include converting reflected signal data to the frequency domain using a Fast Fourier Transform (or any other technique to convert time domain signals to frequency domain for analysis). S230 may also improve system performance by using a Sliding Fast Fourier transform (SFFT) or similar techniques such as the Sliding Discrete Fourier Transform (SDFT) and Short-time Fourier Transform (STFT). These techniques allow Fourier transforms for successive samples in a sample stream to be computed with substantially lower computational overhead, improving performance.

Figure 5A:
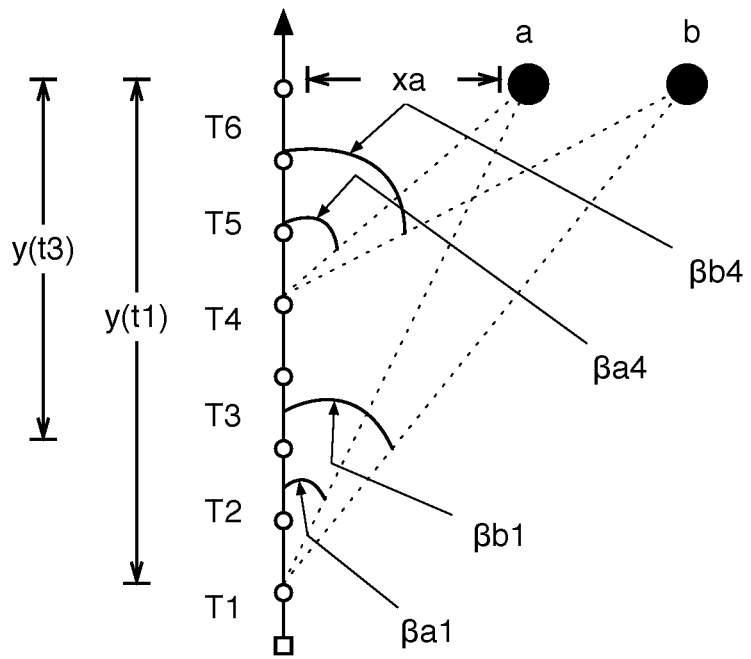
FIG. 5A is a two-dimensional example view of a moving radar passing stationary targets.
Figure 5B:
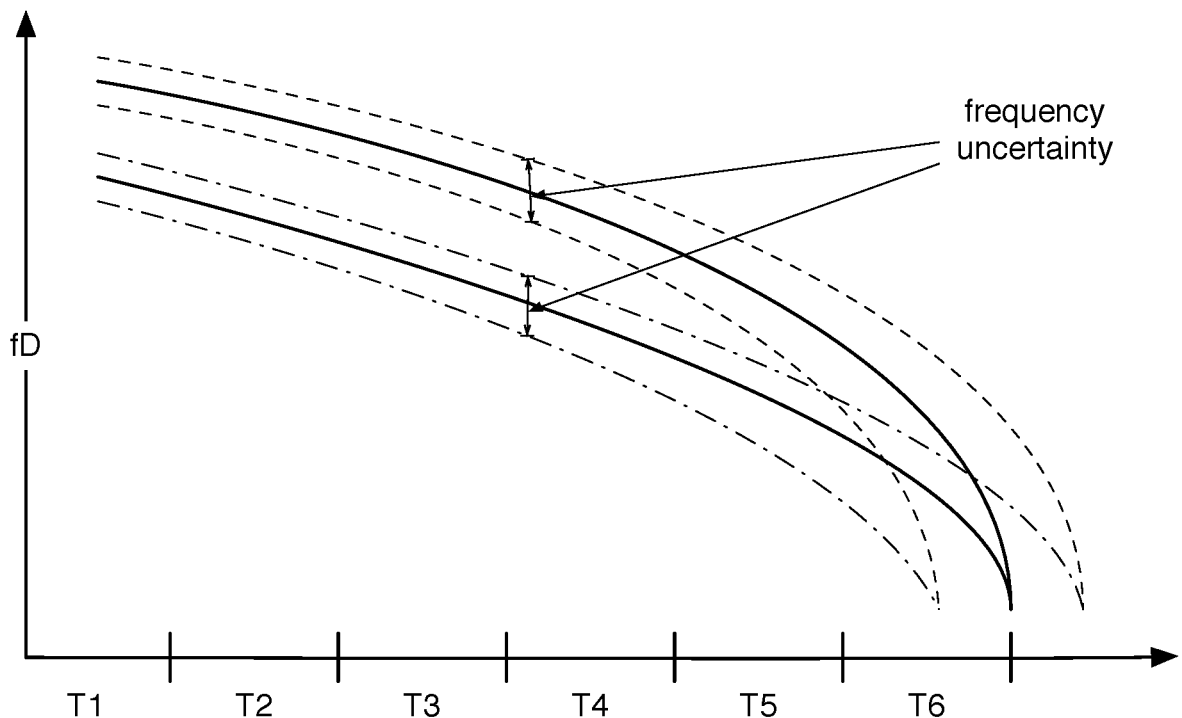
FIG. 5B is a frequency output view of data produced according to FIG. 5A.
Figure 5C:
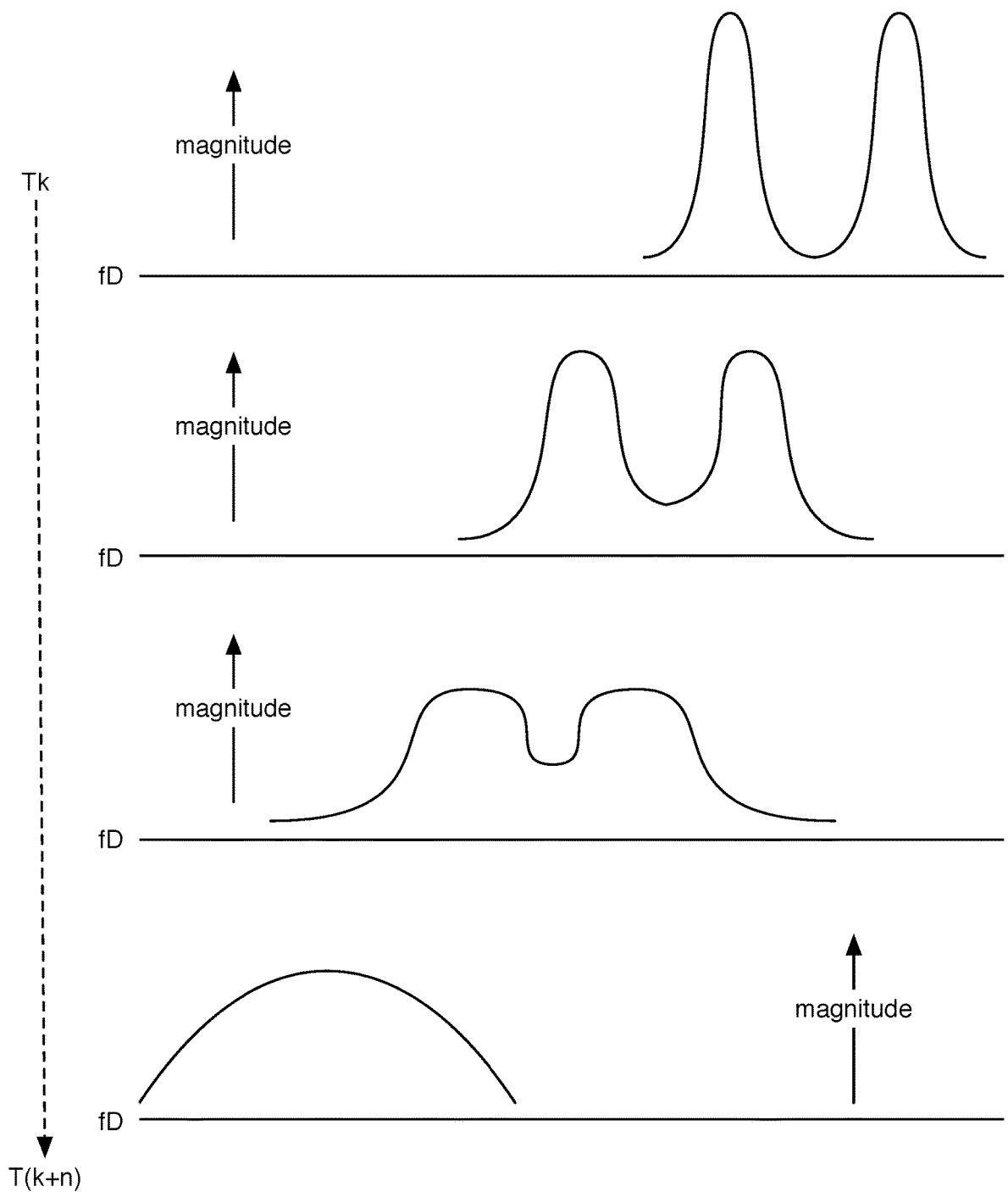
FIG. 5C is a time series view of magnitude and frequency output of data produced according to FIG. 5A.

For example, a moving radar passes two stationary targets (target a and target b) while moving at a constant velocity v, as shown in FIG. 5A. At each time sample, the radar has moved, and thus the composite angles between the radar and the targets have changed (e.g., βb4 corresponds to the composite angle formed between the radar and target b at end of time period T4). Taking the Fourier transform with respect to time provides the Doppler frequency shift data as shown in FIG. 5B and FIG. 5C. Note that as the composite angles go from their largest to smallest, a few effects happen. Given the aforementioned constant velocity:

$$\beta_a(y) = \arctan\frac{x_a}{y}; \beta_b(y) = \arctan\frac{x_b}{y}$$

$$f_{Da}(y) = Kv\cos\arctan\frac{x_a}{y} = \frac{Kv}{\sqrt{1+\frac{x_a^2}{y^2}}}; f_{Db}(y) = \frac{Kv}{\sqrt{1+\frac{x_b^2}{y^2}}}$$

$$\Delta f_D = Kv\left(\frac{1}{\sqrt{1+\frac{x_a^2}{y^2}}} - \frac{1}{\sqrt{1+\frac{x_b^2}{y^2}}}\right)$$

$$\beta = \arccos\frac{f_D}{Kv}$$

Thus, the first effect is simply that the rate of change of Doppler frequency shift with respect to β increases as β increases (increasing angular resolution as $\beta \rightarrow \beta_{max}$). The second effect is that the difference in composite angle between two closely spaced targets increases as from 0 as β: 0→45° and then decreases thereafter (to zero at β=90°). This suggests that even as angular resolution increases, it may be more difficult to distinguish two targets at large angles relying solely on β. That being said, the effect of increase in resolution outpaces the decrease in angle until β≈55° (angle of maximum angular separation between two closely spaced targets), and $\Delta f_D$ does not again approach the value at has at 20 degrees (a typical angle) until 83 degrees (a very large angle) suggesting that the majority of this impact may apply in angular ranges not covered by radar.

The third effect follows from exposing time dependence of the composite angle. As the radar approaches the target, $$\frac{d\beta}{dt}$$

increases; resultantly, the sampling time for a given angular interval decreases (alternatively stated, in a given time period, the angle changes more), causing smearing in the Fourier transform required to calculate Doppler shift and reducing the ability to distinguish targets.

While S230 may include calculating composite angle directly from the Fourier transform of reflected probe signal data (e.g., by taking the center frequency of the frequency bucket with the highest magnitude as the Doppler frequency shift), S230 may additionally or alternatively include producing (for each time period of a set) a set of angle-adjusted frequency outputs S232. S232 preferably includes generating one or modified outputs from the reflected probe signal based on a predicted composite angle (B, distinct from actual composite angle β). In one invention embodiment, S232 includes generating (for a set of angle ranges from $\{B_{min}, B_{min}+\Delta\}$ to $\{B_{max}-\Delta, B_{max}\}$) a set of Fourier transformed outputs for each angle range in the set. Take, for example, a signal of cos $[2\pi f_{Dmax}$ t cos $\beta]$. Instead of taking the Fourier transform with respect to t (the traditional technique), S232 may include taking the Fourier transform with respect to $\tau$=t cos B for each angle range (e.g., by taking the transform with respect to $\tau$=t cos B for the center angles of each range), ideally generating an output frequency of $$2\pi f_{Dmax} \frac{\cos\beta}{\cos B}$$

for a target at angle $\beta$.

S232 preferably functions to provide a more consistent and/or more easily implemented method of determining Doppler shift for a given target than traditional implementations; by producing a set of Fourier transformed outputs (each corresponding to a different angle interval), the member of the set with the closest frequency output to $f_{Dmax}$ (the Doppler shift for an angle of zero) can be chosen, thus locating the composite angle within a pre-specified interval. Alternatively, S232 may be thought of as identifying angle ranges in which targets exist (e.g., angle ranges in which the frequency magnitude around $f_{Dmax}$ is higher than a threshold).

Note that unless the angle ranges are very small at larger angles (requiring more Fourier transforms to be performed for a single time interval), there will likely still be some change in cos $\beta$ during the sampling period (causing smearing and reduced accuracy).

To address this issue, S232 may additionally or alternatively include pre-warping reflected signal data while performing the Fourier transform. In an implementation including pre-warping, S232 preferably functions to effectively warp reflected signal data with respect to changing angles by selectively sampling reflected signal data as input for the Fourier transform.

This may be illustrated as follows. Assume that a radar receiver takes samples at every interval $\{t_0, t_1, \ldots\}$. Without pre-warping, S232 may include performing discrete Fourier transforms for $\{B_0, B_1 \ldots\}$ with respect to $\tau$=t cos B across a subset of these time intervals (frequency resolution is determined by time and not directly by sample rate, so using more samples than necessary to resolve a given Doppler frequency takes more computational time and provides little benefit); say, for example, $\{t_0, t_{10}, t_{20}, t_{30}, t_{40}, t_{50}\}$. At larger target angles, as previously mentioned, target angles may change noticeably during this time period, causing smearing in the output.

To pre-warp, S232 includes selecting non-uniformly spaced samples in time to reflect the change in angle across an angle interval. For example, to pre-warp the Fourier transform for $B_1$, S232 may include selecting samples based on the assumption that over the angle range from $B_1-\Delta$ to $B_1+\Delta$, the composite angle changes linearly with time over the sampling period. The signal can thus be modeled as:

$$\cos\left[2\pi f_{Dmax} t \cos\left[\beta + \Delta\left(\frac{2t}{T} - 1\right)\right]\right] =$$

$$\cos\left[2\pi f_{Dmax} t \cos[\beta]\left(\cos\left[\Delta\left(\frac{2t}{T} - 1\right)\right] + \tan[\beta]\sin\left[\Delta\left(\frac{2t}{T} - 1\right)\right]\right)\right], t \to \{0, T\}$$

$$\cos\left[2\pi f_{Dmax}\tau \frac{\cos\beta}{\cos B}\left(\cos\left[\Delta\left(\frac{2\tau}{T\cos B} - 1\right)\right] + \tan[\beta]\sin\left[\Delta\left(\frac{2\tau}{T\cos B} - 1\right)\right]\right)\right],$$

$$\tau \to \{0, T\cos B\}$$

Figure 6:
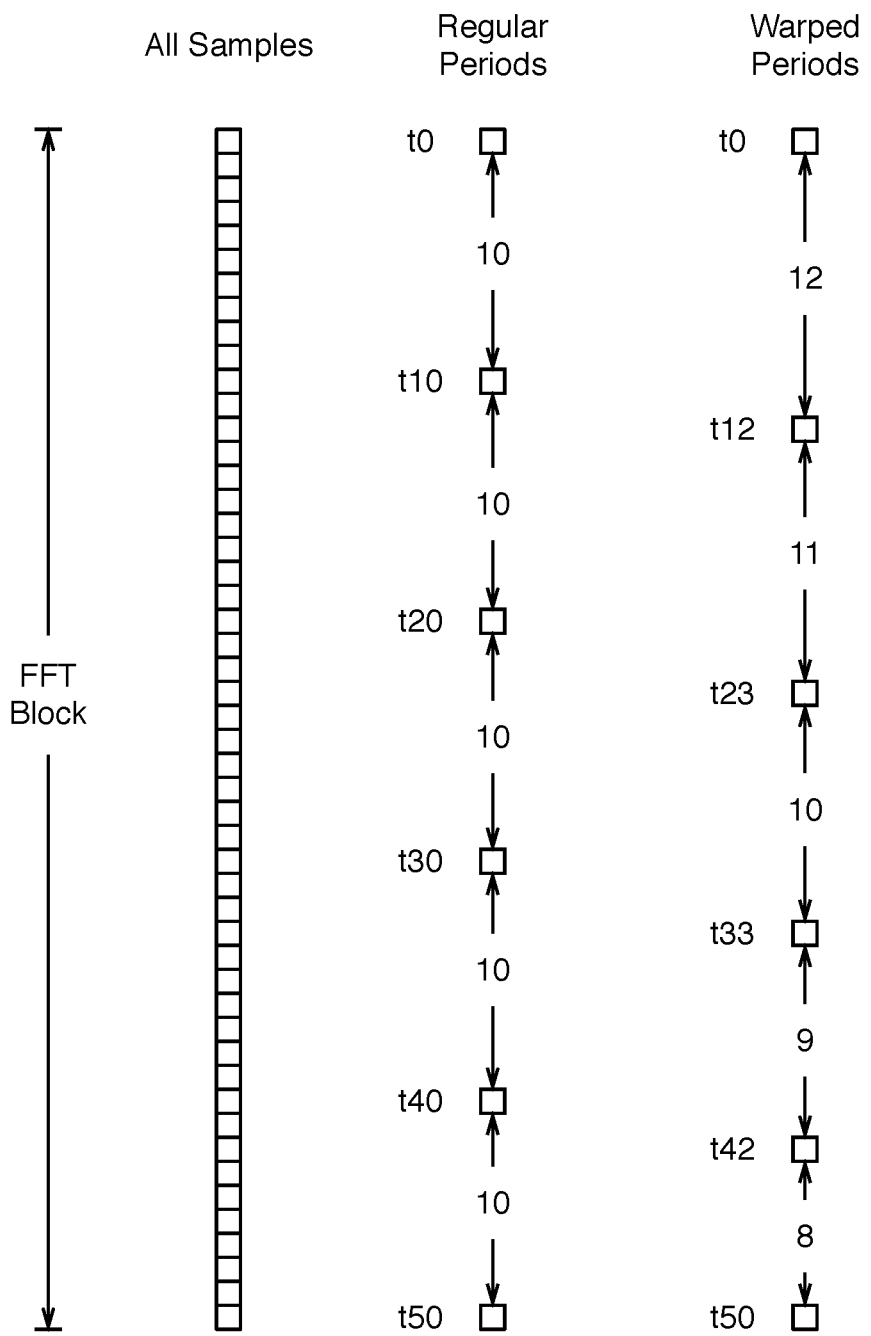
FIG. 6 is an example view of regular sampling and time-warping sampling of a method of an invention embodiment.

To account for this additional factor on t, the sampling periods in t may be stretched or shrunk. For example, at t=0, t is multiplied by (cos $[-\Delta]$+tan $[\beta]$ sin$[-\Delta]$). Assuming $\beta$=45°, $\Delta$=10° (a large delta is chosen for illustration) this factor is equivalent to 0.81. The corresponding factor at t=T is 1.16. Accordingly, to adjust for this shift, the sampling periods (or sampling frequency) for the Fourier transform may be scaled appropriately, e.g., sampling at $\{t_0, t_{12}, t_{23}, t_{33}, t_{42}, t_{50}\}$, as shown in FIG. 6.

The transform period for S232 may be uniform in time across B, (e.g., for $B_1$, T=$T_1$, $T_\tau$=$T_1$ cos $B_1$ while for $B_2$, T=$T_1$, $T_\tau$=$T_1$ cos $B_2$), however, this results in decreased frequency resolution for larger B relative to that of smaller B (i.e., $T_1$ cos $B_2$<$T_1$ cos $B_1$). Thus, S232 may additionally or alternatively include modifying transform period based on B to allow for uniform frequency resolution (or alternatively, any modified frequency resolution set), as shown in FIG. 7.

For example, assume that constant frequency resolution is desired at all B. In this case, the sampling period for each B (in t) should be $$T = T_1 \frac{\cos B_{min}}{\cos B}$$

where the desired frequency resolution at $$B = B_{min} \frac{1}{T_1}\left(e.g., T_2 = T_1 \frac{\cos B_1}{\cos B_2}, T_3 = T_1 \frac{\cos B_1}{\cos B_3}\right).$$

Figure 7:
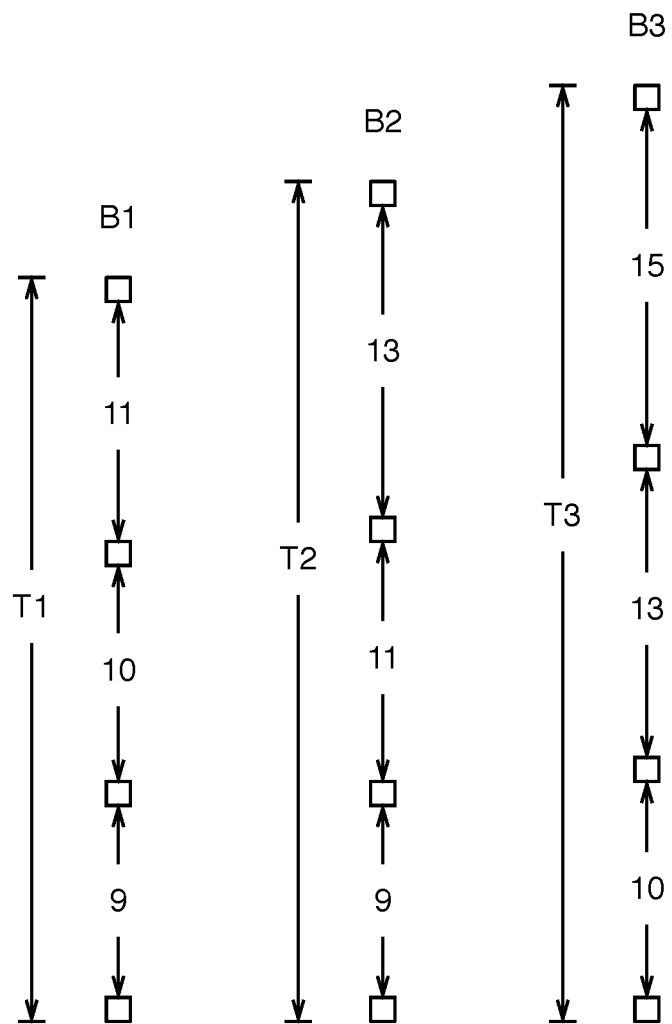
FIG. 7 is an example view of varied transform periods of a method of an invention embodiment.

Note that while the example as shown in FIG. 7 utilizes both non-uniform sampling (i.e., time-warping) and varied transform periods, S230 may alternatively include varying transform periods without performing time-warping.

Figure 8:
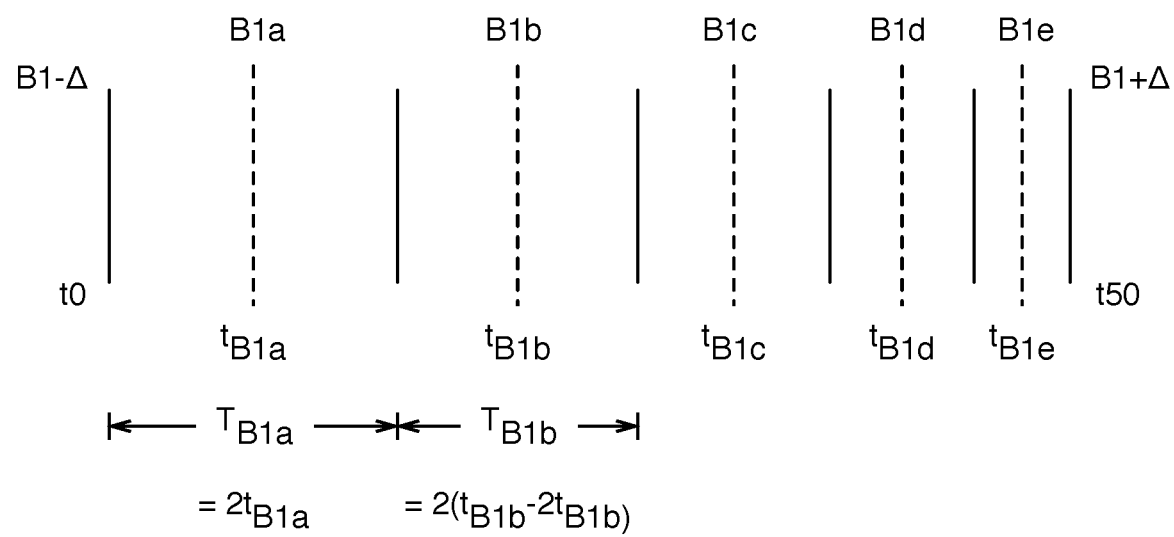
FIG. 8 is an example view of time-warping of a method of an invention embodiment.

The examples so far have relied on opportunistically selecting existing samples from a sample stream; however, S230 may additionally or alternatively include resampling reflected probe signal data S231. S231 preferably includes resampling reflected probe signal data per angle B based on a desired set of sampling times. For example, in the example shown in FIG. 6, S232 sampled at $\{t_0, t_{12}, t_{23}, t_{33}, t_{42}, t_{50}\}$, but these sample numbers were not based on exact scaling factors (rather, the closest available sample to a scaling factor was selected). Using one method of calculating time samples (subdividing the time window into segments scaled by the center angle of those segments, assuming composite angle changes linearly with time), as shown in FIG. 8, the following set may be desired for sampling $\{t_0, t_{11.66}, t_{22.27}, t_{32.12}, t_{41.39}, t_{50}\}$. Since these indices do not correspond to samples, S231 preferably includes resampling the reflected probe signal data to generate these values. S231 may include resampling the reflected probe signal data in any manner;

e.g., via linear interpolation ($t_{11.66}=t_{11}+0.66(t_{12}-t_{11})$). S231 may include determining sampling periods for resampling in any manner.

In a first example implementation, S230 includes dividing an angular space (e.g., $\{B_{min}, B_{max}\}$) into uniform ranges (e.g., $\{15°\pm5°, 25°\pm5°, 35°\pm5°, 45°\pm5°\}$ for an angle range from 10 to 50 degrees). Alternatively, S230 may include selecting composite angles or angular ranges in any manner. Note that the set of angular ranges may be continuous and non-overlapping (e.g., $15°\pm5°, 25°\pm5°$), but may additionally or alternatively be discontinuous (e.g., $15°\pm2°, 25°\pm2°$) and/or overlapping (e.g., $15°\pm10°, 25°\pm5°$). Further note that while angular ranges may be uniform, they may additionally or alternatively be non-uniform.

After determining the set of angles (or angle ranges) for which computation (in S232) is to be performed, S230 preferably includes determining the overall transform period for each angle. S230 may include determining this in any manner (e.g., by scaling the time periods such that they are equal in T as previously described). Then, S230 preferably includes determining how sampling should be performed for each of the angles (e.g., how the FFT block is divided). As previously described, one technique for doing this involves selecting a base sampling period (e.g., every ten samples, or every 10 ms) and then warping the sampling periods to account for linear change in angle over that time. For example, if the base sampling period is 10 ms for an angle range $B_1\pm\Delta$ centered at $B_1$ and an overall transform period of 50 ms, the first sampling period may be $T_{B1a}$, where $$T_{B1a} = 2t_{B1a} = 10\text{ms} \times \frac{\cos B_{1a}}{\cos B_1}; B_{1a} = B_1 - \Delta + \frac{2\Delta t_{B1a}}{50\text{ms}},$$

as shown in FIG. 8. Likewise, the second period may be chosen so $$T_{B1b} = 2(f_{B1b} - 2f_{B1a}) = 10\text{ms} \times \frac{\cos B_{1b}}{\cos B_1}; B_{1b} = B_1 - \Delta + \frac{2\Delta t_{B1b}}{50\text{ms}},$$

so on and so forth.

After generation of these periods, resampling (if desired) may be performed in S231 (alternatively, existing samples may be selected in any manner; e.g., to achieve time-warping) and then Fourier transforms may be performed in S232 for each angle.

In a variation of an invention embodiment, S230 includes performing multiple Fourier passes; for example, performing transforms for angle ranges of $25\pm10°$ and $35\pm10°$, detecting that one or more targets exists in the $35\pm10°$ range, and then performing transforms for $30\pm5°$, $35\pm5°$, and $40\pm5°$ ranges in a second pass.

S240 includes refining the initial tracking parameters. S240 functions to generate a more accurate tracking solution than that initially calculated by S230. In a first example implementation, S240 includes running a Kalman filter on Cartesian coordinates of a target generated from elevation angle or azimuth angle (determined from phase information), range, and composite angle (determined from Doppler shift), constrained by error bounds of the composite angle. In a second example implementation, S240 includes running a Kalman filter on Cartesian coordinates of a target generated from elevation angle and azimuth angle (determined from phase information), range, and composite angle (determined from Doppler shift), constrained by error bounds of the composite angle.

S240 may additionally or alternatively include filtering, refining, and/or constraining tracking parameters in any manner.

The methods of the preferred embodiment and variations thereof can be embodied and/or implemented at least in part as a machine configured to receive a computer-readable medium storing computer-readable instruction. The instructions are preferably executed by computer-executable components preferably integrated with a system for Doppler-enhanced radar tracking. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for Doppler-enhanced radar tracking, comprising:
   transmitting a probe signal;
   in response to reflection of the probe signal by a tracking target, at a radar array comprising a first plurality of radar elements positioned substantially along a first radar axis, receiving a reflected probe signal, wherein the tracking target and radar array cooperatively define a target vector from the radar array to the tracking target;
   based on the reflected probe signal, determining a target range between the radar array and the tracking target;
   based on the reflected probe signal, determining Doppler shift information, comprising:
      determining a set of predicted target composite angles; and
      for each predicted target composite angle of the set, determining a respective set of frequency domain outputs; and
   based on the reflected probe signal and the Doppler shift information, determining an actual target composite angle; wherein the actual target composite angle is an angle between the target vector and a composite reference vector.

2. The method of claim 1, further comprising receiving egovelocity data, wherein determining the actual target composite angle is performed based further on the egovelocity data.

3. The method of claim 2, further comprising determining that the tracking target is stationary with respect to an environment through which the radar array is moving.

4. The method of claim 1, further comprising determining that the tracking target is stationary with respect to an environment through which the radar array is moving.

5. The method of claim 4, further comprising:
   in response to reflection of the probe signal by a set of environmental objects, at the radar array, receiving a set of reflected probe signals; and based on the set of reflected probe signals, determining additional Doppler shift information associated with the set of environmental objects; wherein
determining that the tracking target is stationary comprises comparing the Doppler shift information to data associated with the set of reflected probe signals.

6. The method of claim 1, wherein, for each predicted target composite angle of the set, determining the respective set of frequency domain outputs comprises determining a Fourier transform based on a respective scaled time variable, wherein the respective scaled time variable is determined based on the predicted target composite angle.

7. A method for Doppler-enhanced radar tracking, comprising:
transmitting a probe signal;
in response to reflection of the probe signal by a tracking target, at a radar array comprising a first plurality of radar elements positioned substantially along a first radar axis, receiving a reflected probe signal, wherein the tracking target and radar array cooperatively define a target vector from the radar array to the tracking target;
based on the reflected probe signal, determining Doppler shift information, comprising:
determining a set of predicted target composite angles; and
for each predicted target composite angle of the set, determining a respective set of frequency domain outputs; and
based on the reflected probe signal and the Doppler shift information, determining an actual target composite angle; wherein
(i) the actual target composite angle is an angle between the target vector and a composite reference vector,
(ii) for each predicted target composite angle of the set, determining the respective set of frequency domain outputs comprises determining a Fourier transform based on a respective scaled time variable, and
(iii) the respective scaled time variable is determined based on the predicted target composite angle.

8. The method of claim 7, wherein, for each predicted target composite angle of the set, the respective scaled time variable is scaled by a cosine of the predicted target composite angle.

9. The method of claim 8, further comprising, for each predicted target composite angle of the set, determining, based on the predicted target composite angle, a respective temporal subset of the reflected probe signal, wherein the Fourier transform is determined over the respective temporal subset.

10. The method of claim 9, wherein the respective temporal subsets are substantially contiguous and substantially non-overlapping.

11. The method of claim 9, wherein, for each predicted target composite angle of the set, a duration of the respective temporal subset is substantially inversely proportional to the cosine of the predicted target composite angle.

12. The method of claim 9, wherein determining the actual target composite angle comprises detecting information indicative of the tracking target in the temporal subset associated with a particular predicted target composite angle of the set, wherein the actual target composite angle is closer to the particular predicted target composite angle than to any other predicted target composite angle of the set, wherein the method further comprises:
based on at least one of: the actual target composite angle or the particular predicted target composite angle, determining a second set of predicted target composite angles;
determining refined Doppler shift information, comprising, for each predicted target composite angle of the second set:
determining a respective shortened temporal subset of the reflected probe signal, wherein a duration of the respective shortened temporal subset is less than the duration of the temporal subset associated with the particular predicted target composite angle; and
determining a Fourier transform, over the respective shortened temporal subset, based on the respective scaled time variable, wherein the respective scaled time variable is scaled by the cosine of the predicted target composite angle; and
based on the refined Doppler shift information, determining a refined target composite angle.

13. The method of claim 12, wherein:
the temporal subset associated with the particular predicted target composite angle is associated with an angular range around the particular predicted target composite angle;
each shortened temporal subset is associated with a respective narrowed angular range; and
the narrowed angular ranges substantially span the angular range.

14. The method of claim 7, wherein, for each predicted target composite angle of the set, determining the Fourier transform based on the respective scaled time variable comprises pre-warping data indicative of the reflected probe signal to account for change in the actual target composite angle over time, wherein pre-warping the data produces data defining a non-uniform sampling rate.

15. A method for Doppler-enhanced radar tracking, comprising:
receiving egovelocity data;
transmitting a probe signal;
in response to reflection of the probe signal by a tracking target, at a radar array comprising a first plurality of radar elements positioned substantially along a first radar axis, receiving a reflected probe signal, wherein the tracking target and radar array cooperatively define a target vector from the radar array to the tracking target;
based on the reflected probe signal, determining Doppler shift information; and
based on the reflected probe signal, the Doppler shift information and the egovelocity data, determining an actual target composite angle; wherein
(i) the actual target composite angle is an angle between the target vector and a composite reference vector,
(ii) determining the Doppler shift information comprises:
determining a set of predicted target composite angles; and
for each predicted target composite angle of the set, determining a Fourier transform based on a respective scaled time variable, and
(iii) the respective scaled time variable is determined based on the predicted target composite angle.

16. The method of claim 15, further comprising:
based on the reflected probe signal, determining a target range between the radar array and the tracking target; and based on the target range and the actual target composite angle, determining a position of the tracking target relative to the radar array.

17. The method of claim 15, wherein the egovelocity data is received from at least one of: a Global Positioning System receiver or an inertial measurement unit.

18. The method of claim 15, further comprising determining that the tracking target is stationary with respect to an environment through which the radar array is moving.

19. The method of claim 18, wherein determining that the tracking target is stationary comprises:
based on the reflected probe signal, determining phase information; and
comparing the Doppler shift information to the phase information.

20. The method of claim 15, wherein, for each predicted target composite angle of the set, the respective scaled time variable is scaled by a cosine of the predicted target composite angle.

* * * * *